No. 840,380. PATENTED JAN. 1, 1907.
M. SAVIDGE.
VETERINARY FORCEPS.
APPLICATION FILED AUG. 22, 1906.

Witnesses
Inventor
Mat Savidge,
By
Victor J. Evans
Attorney

UNITED STATES PATENT OFFICE.

MATTHEW SAVIDGE, OF DELOIT, NEBRASKA.

VETERINARY FORCEPS.

No. 840,380.

Specification of Letters Patent.

Patented Jan. 1, 1907.

Application filed August 22, 1906. Serial No. 331,627.

*To all whom it may concern:*

Be it known that I, MATTHEW SAVIDGE, a citizen of the United States of America, residing at Deloit, in the county of Holt and State of Nebraska, have invented new and useful Improvements in Veterinary Forceps, of which the following is a specification.

This invention relates to veterinary forceps; and one of the principal objects of the same is to provide an instrument of this character which shall be simple in construction and in which the jaws may be retracted within the handle of the instrument and which will be easy to operate.

Another object is to provide an instrument of this character with pivoted jaws and a threaded traveler connected to said jaws by a ball-and-socket joint, whereby the jaws may be retracted within the tubular handle of the instrument.

These and other objects are attained by means of the construction illustrated in the accompanying drawings, in which—

Figure 1:
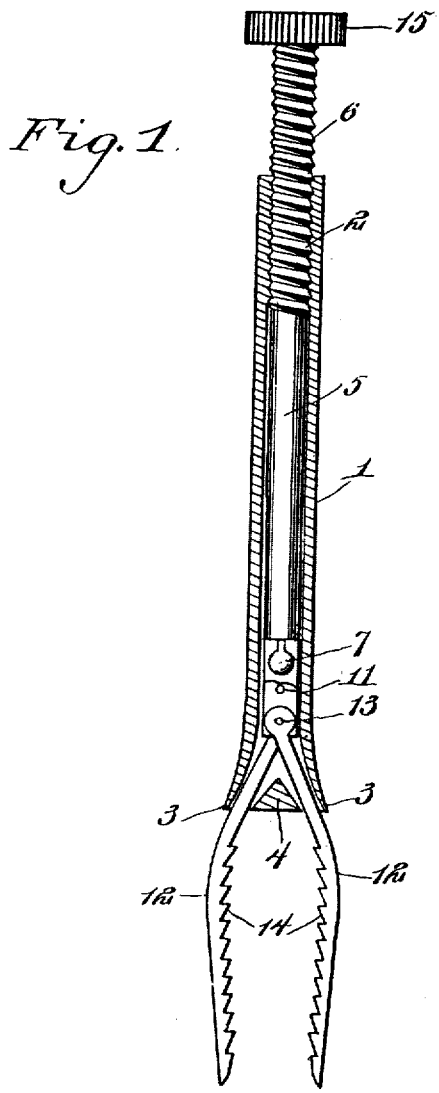
Figure 2:
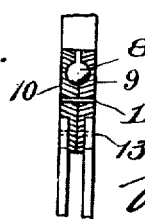

Figure 1 is a longitudinal section of an instrument made in accordance with my invention. Fig. 2 is a detail sectional view of the two members forming the socket for the ball of the stem and the bearing for the pivoted jaws.

Referring to the drawings for a more particular description of my invention, the numeral 1 designates the tubular body portion of the instrument provided at one end with a series of internal screw-threads 2 and at the opposite end with a flaring outlet 3 upon opposite sides thereof and an intermediate jaw-guide 4. Mounted to move within the tube is a stem 5, provided with a threaded portion 6, designed to engage the threads 2 of the tube 1 to move longitudinally within said tube, said stem having at its inner end a ball 7, said ball being seated within a socket 8, formed in the sectional members 9 10 of a bearing secured together by a pin 11 and having the jaws 12 pivoted thereto at 13. The jaws 12 are curved, as shown in Fig. 1, and are provided with a series of teeth 14, said teeth being formed on the inner surface of the jaws.

The operation of my instrument may be readily understood from the foregoing. The stem 1 is rotated by means of a milled head 15 to project the jaws 12 or to retract them, as will be understood, the ball 7 rotating within the socket 8 and moving the jaws 12 inward and outward through the opening 3 at opposite sides of the guide 4.

From the foregoing it will be obvious that my instrument is of simple construction, can be quickly operated, and will be found very efficient for its purpose.

Having thus described the invention, what is claimed as new is—

1. A veterinary forcep comprising a tubular body portion internally threaded at one end and provided with flaring openings at the opposite end, an intermediate jaw-guide, a stem mounted to move within the tube and provided with threads to engage the interior threads of the tube, a ball formed on the inner end of said stem, a sectional bearing provided with a socket for said ball, and a pair of curved jaws pivoted to said sectional bearing, to be operated substantially as described.

2. A veterinary forcep comprising a tubular body portion, a stem moving within said body portion, a sectional bearing provided with a socket to accommodate a ball upon said stem, and a pair of jaws projected and retracted by the movement of said stem, substantially as described.

3. In a veterinary forcep, a bearing provided with a socket, a stem provided with a ball to engage said socket, a tubular body portion flaring openings in said tubular body portion, an intermediate jaw-guide, and curved jaws pivoted to said bearing and projecting through said flaring openings, substantially as described.

In testimony whereof I affix my signature in presence of two witnesses.

MAT SAVIDGE.

Witnesses:
S. W. BRIAN, Jr.,
J. L. FISHER.